(12) United States Patent
Li et al.

(10) Patent No.: US 10,641,088 B2
(45) Date of Patent: May 5, 2020

(54) METHOD AND DEVICE FOR DETERMINING KARST DEVELOPMENT DEGREE OF RESERVOIR, COMPUTER READABLE STORAGE MEDIUM AND DEVICE

(71) Applicant: PetroChina Company Limited, Beijing (CN)

(72) Inventors: Ning Li, Beijing (CN); Hongliang Wu, Beijing (CN); Zhou Feng, Beijing (CN); Qingfu Feng, Beijing (CN); Kewen Wang, Beijing (CN); Xiaotao Zhang, Beijing (CN); Gong Zhang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 64 days.

(21) Appl. No.: 15/990,054

(22) Filed: May 25, 2018

(65) Prior Publication Data

US 2018/0274364 A1    Sep. 27, 2018

Related U.S. Application Data

(63) Continuation of application No. PCT/CN2016/112856, filed on Dec. 29, 2016.

(30) Foreign Application Priority Data

Dec. 30, 2015  (CN) .......................... 2015 1 1021367

(51) Int. Cl.
  *G06T 7/90*   (2017.01)
  *E21B 49/00*  (2006.01)
  (Continued)

(52) U.S. Cl.
  CPC .......... *E21B 49/00* (2013.01); *E21B 47/0002* (2013.01); *G01V 1/40* (2013.01);
  (Continued)

(58) Field of Classification Search
  CPC .... E21B 49/00; E21B 47/0002; E21B 49/087; G06T 7/90; G06T 7/40;
  (Continued)

(56) References Cited

U.S. PATENT DOCUMENTS

| 4,646,240 A | 2/1987 | Serra et al. |
| 2010/0084131 A1 | 4/2010 | Bouzas et al. |

FOREIGN PATENT DOCUMENTS

| CN | 101892837 A | 11/2010 |
| CN | 101936165 A | 1/2011 |

(Continued)

OTHER PUBLICATIONS

Matsushi, Y., et al., "Denudation rates of carbonate pinnacles in Japanese karst areas: Estimates from cosmogenic 36 CI in calcite," Nuclear Instruments and Methods in Physics Research Section B: Beam Interactions with Materials and Atoms, vol. 268, issues 7-8, pp. 1205-1208, Apr. 1, 2010.

(Continued)

Primary Examiner — Amandeep Saini
(74) Attorney, Agent, or Firm — Hamilton, Brook, Smith & Reynolds, P.C.

(57) ABSTRACT

The present invention relates to the technical field of well logging interpretation. The present invention provides a method for determining the karst development degree of a reservoir, a computer readable storage medium and a device, and pertains to the technical field of well logging interpretation, the method comprising: extracting vertical denudation pore features and horizontal denudation pore features from electrical imaging logging image data of a undeter- (Continued)

mined reservoir, and counting well logging feature parameters; determining karst belts of the undetermined reservoir and classifying the karst development degree according to the vertical denudation pore features, the horizontal denudation pore features and the well logging feature parameters; and determining the available reservoir development degree of the undetermined reservoir according to the karst belts and the result of the classified karst development degree. By means of classifying the karst development degree of the undetermined reservoir based on the vertical denudation pore features, the horizontal denudation pore features and the well logging feature parameters extracted from the electrical imaging logging image data, we can quickly and visually identify karst belts in a reservoir and classify the karst development degree. And the discrimination result is consistent with that of cores, which provides important technical supports for exploration and development of an oil-gas field.

12 Claims, 5 Drawing Sheets (51) Int. Cl.
G01V 1/40 (2006.01)
G01V 11/00 (2006.01)
G01V 3/18 (2006.01)
G06T 7/00 (2017.01)
G06K 9/00 (2006.01)
E21B 47/00 (2012.01)
G01V 8/02 (2006.01)
G06K 9/46 (2006.01)
G06K 9/62 (2006.01)
G06T 7/40 (2017.01)

(52) U.S. Cl.
CPC .................. *G01V 3/18* (2013.01); *G01V 8/02* (2013.01); *G01V 11/00* (2013.01); *G06K 9/0014* (2013.01); *G06K 9/0063* (2013.01); *G06K 9/4652* (2013.01); *G06K 9/6268* (2013.01); *G06T 7/0004* (2013.01); *G06T 7/40* (2013.01); *G06T 7/90* (2017.01); *G06K 9/629* (2013.01); *G06T 2207/10024* (2013.01); *G06T 2207/30184* (2013.01)

(58) Field of Classification Search
CPC . G06T 2207/10024; G06T 2207/30184; G06T 7/0004; G01V 8/02; G01V 11/00; G01V 3/18; G01V 1/40; G01V 3/38; G06K 9/0063; G06K 9/4652; G06K 9/6268; G06K 9/629; G06K 9/0014
USPC .......................................................... 382/108
See application file for complete search history.

(56) References Cited

FOREIGN PATENT DOCUMENTS

| CN | 102011583 A | | 4/2011 |
|---|---|---|---|
| CN | 102042010 A | * | 5/2011 |
| CN | 102042010 A | | 5/2011 |
| CN | 102352749 A | | 2/2012 |
| CN | 102373923 A | | 3/2012 |
| CN | 102352749 B | | 10/2013 |
| CN | 103529475 A | | 1/2014 |
| CN | 103776981 A | | 5/2014 |
| CN | 104732562 A | | 6/2015 |
| CN | 104806212 A | | 7/2015 |
| CN | 104866856 A | | 8/2015 |
| CN | 105626058 A | | 6/2016 |
| CN | 105372716 B | | 3/2018 |

OTHER PUBLICATIONS

Zhao, W., et al., "Carbonate karst reservoirs of the Tarim Basin, northwest China: Types, features, origins, and implications for hydrocarbon exploration," Interpretation, vol. 2, No. 3, pp. SF65-SF90, Aug. 1, 2014.
Zheng, D., et al., "Characterization and Modeling Study of Karst Networks in the Ordovician Carbonate Reservoirs, Tarim Basin," Aug. 29, 2011.
International Search Report for Int'l Application No. PCT/CN2016/112856, titled: Method and Device for Determining Dissolution Degree of Karst Reservoir, dated Mar. 13, 2017.
Chinese Search Report for Chinese Application No. CN201511021367.2, titled: Method and device for determining development degree of reservoir karst, 4 pages, dated Feb. 10, 2018.(with English translation).
Li, Shi-bai et al., "Research on Karst Growth Exten," Electric Prower Survey & Design, vol. 5, pp. 1-5 (Oct. 2012).
Wang, Yu et al., "An Evaluation Method in Micro-Zoning for Karst Development Degree," Soil Eng. and Foundation, vol. 25, No. 4, pp. 56-58 (Aug. 2011) (English Abstract located on p. 58).

* cited by examiner

METHOD AND DEVICE FOR DETERMINING KARST DEVELOPMENT DEGREE OF RESERVOIR, COMPUTER READABLE STORAGE MEDIUM AND DEVICE

RELATED APPLICATION(S)

This application is a continuation of International Application No. PCT/CN2016/112856, which designated the United States and was filed on Dec. 29, 2016, published in Chinese, which claims priority to Chinese Application No. 201511021367.2, filed on Dec. 30, 2015. The entire teachings of the above applications are incorporated herein by reference.

TECHNICAL FIELD

The present invention relates to a method and device for determining the karst development degree of a reservoir, a computer readable storage medium and a device, and pertains to the technical field of well logging interpretation.

BACKGROUND

Weathered crust karst-type oil-gas reservoirs are one of important types of carbonate oil-gas resources. A large number of studies have shown that a key factor of controlling development and distribution of weathered crust karst-type reservoirs lies in a development degree of karstification. Forming erosion fractured cavities by modification of the original formation by means of karstification, which has a significant impact on reservoir properties of reservoirs and enhancement of seepage capability. Therefore, how to accurately identify weathered crust karst-type reservoirs and classify the development degree of karstification by using the existing logging methods can provide important technical basis for distinguishing reservoir validity, increasing oil and gas reserves and developing measures for oil and gas wells.

An evaluation of a karst development degree in the prior art is mainly based on observation and description of cores, where a qualitative classification of dissolved apertures on the surface of rocks and developments of fractures is performed by coring the reservoirs or sampling and observing outcrop rock drilling. Such methods are highly dependent upon cores with high cost and poor operability. In addition, since the cores acquired in the oil field are always discontinuous, and a complete coring is very difficult at the fracture development interval, it is difficult for the karst development features observed on the cores to represent overall conditions of reservoirs, thereby affecting a comprehensive discrimination of the reservoirs.

Although imaging logging in conjunction with conventional logging techniques have been used in the prior art to classify weathered crust karst-type reservoirs into karst zones, such as a supergenic karst zone, a vertical vadose zone, a horizontal hyporheic zone and the like longitudinally, and identify the karst zones according to imaging logging feature pattern plates and logging response feature modes of different karst zones qualitatively. However, the development degree of specific karstification of the karst zones is not classified or evaluated, thus an application of processing interpretation of the imaging logging data essentially remains in the qualitative analysis stage, it cannot meet requirements of logging evaluation of the weathered crust karst-type reservoirs.

SUMMARY

In order to solve the problems that the existing method of classification of karst development degree has strong multiplicity and poor operability, and cannot meet the requirements of well logging evaluation of weathered crust karst-type reservoirs, a method and a device for determining the karst development degree of a reservoir is proposed, concretely including the following technical solutions.

A method for determining the karst development degree of a reservoir includes:

extracting vertical denudation pore features and horizontal denudation pore features from electrical imaging logging image data of a undetermined reservoir, and counting well logging feature parameters;

determining karst belts of the undetermined reservoir and classifying the karst development degree according to the vertical denudation pore features, the horizontal denudation pore features and the well logging feature parameters; and determining the available reservoir development degree of the undetermined reservoir according to the karst belts and the result of the classified karst development degree.

In addition, the present invention further provides a computer readable storage medium including computer readable instructions, the computer readable instructions are executed to enable the processor to at least perform the operation in the method for determining the karst development degree of a reservoir.

Also, the present invention further provides a device, includes:

a memory storing program instructions; and a processor connected to the memory, executing the program instructions in the memory, and determining the available reservoir development degree of the undetermined reservoir according to the steps stated in the method for determining the karst development degree of a reservoir.

The advantages of the present invention are as follows: by means of classifying the karst development degree of the undetermined reservoir based on the vertical denudation pore features, the horizontal denudation pore features and the well logging feature parameters extracted from the electrical imaging logging image data, we can quickly and visually identify karst belts in a reservoir and classify the karst development degree. And the discrimination result is consistent with that of cores, which provides important technical supports for exploration and development of an oil-gas field.

DETAILED DESCRIPTION

Since the existing methods cannot classify the development degree of specific karstification of karst belts in weathered crust karst-type reservoirs in the prior art, it is impossible to determine an overall condition of reservoirs that affects the logging evaluation results of such reservoirs. However, the inventor of the present invention found in studies of the weathered crust karst-type reservoirs that: the vertical percolation karsts had karstifications dominated by vertical denudation and developed vertical denudation pores; the horizontal underwater current karsts had karstifications dominated by horizontal denudation and developed layered-denudation pores; and the development degree of denudation pores reflects the level of karstification in stratum. Therefore, the development degree of karstification of reservoirs can be classified by identifying and extracting the denudation pore features in the vertical percolation karsts and the horizontal underwater current karsts on the electrical imaging logging images.

Figure 1:
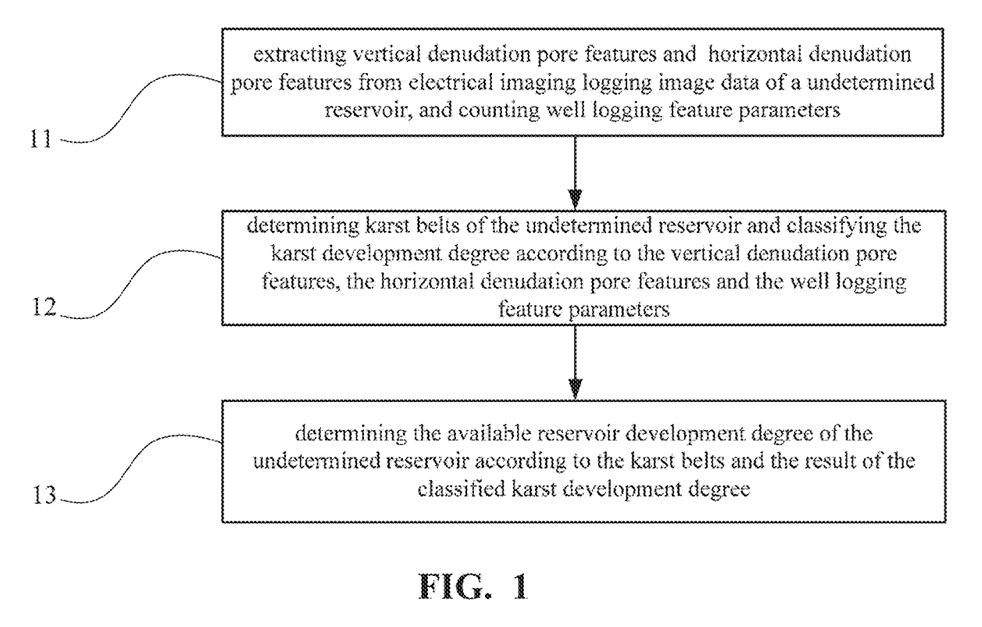
FIG. 1 is a flowchart illustrating a method for determining the karst development degree of a reservoir by way of example.

As illustrated in FIG. 1, the method for determining the karst development degree of the reservoir proposed in this embodiment includes:

Step 11, extracting vertical denudation pore features and horizontal denudation pore features from electrical imaging logging image data of a undetermined reservoir, and counting well logging feature parameters.

The electrical imaging logging image data of the undetermined reservoir can be obtained from measurements of the existing electrical imaging logging instruments, and the static images and dynamic images can be obtained after processing the electrical imaging logging data by the predetermined processing method. The static images and dynamic images can be processed by the predetermined probabilistic interpolation processing method to obtain full borehole-covered electrical imaging logging image data.

By means of image analysis, the vertical denudation pore features and the horizontal denudation pore features are quantitatively extracted from the electrical imaging logging image data of the undetermined reservoir, and feature parameters of the vertical denudation pore and the horizontal denudation pore are counted in the unit depth range.

In practice, in order to obtain more features and well logging feature parameters, the vertical denudation pore features and the horizontal denudation pore features can also be extracted from the full borehole-covered electrical imaging logging image data and the well logging feature parameters can be counted.

Alternatively, processes of obtaining the vertical denudation pore features and the horizontal denudation pore features include three parts: the feature color, the feature morphology and the feature texture. This embodiment determines the category of the features by comprehensively analyzing the feature color, the feature morphology and the feature texture on the basis of the electrical imaging logging image.

Alternatively, the feature parameters of the vertical denudation pore and the horizontal denudation pore include: plane porosity, average particle size and number of the pores. This embodiment counts the plane porosity, average particle size and number of the vertical denudation pore and the horizontal denudation pore in the unit depth range on the basis of extraction of the image features.

Step 12: determining karst belts of the undetermined reservoir and classifying the karst development degree according to the vertical denudation pore features, the horizontal denudation pore features and the well logging feature parameters.

The karst belts of the undetermined reservoir pertains can be discriminated according to the vertical denudation pore features and the horizontal denudation pore features. If the plane porosity of the vertical denudation pore $Ap_V$ is greater than the plane porosity of the horizontal denudation pore $Ap_H$, the corresponding undetermined reservoir can be determined to be located in vertical percolation karsts, otherwise it is located in horizontal underwater current karsts.

Alternatively, the development index of the vertical percolation karsts $Kf_V$ and the development index of the horizontal underwater current karsts $Kf_H$ can be determined by the the plane porosity, the particle sizes, the number of the denudation pore, the formation porosity and the karst thickness in the well logging feature parameters.

According to the determined development index of the vertical percolation karsts $Kf_V$ and the determined development index of the horizontal underwater current karsts $Kf_H$, the karst development degree can be directly classified. The greater the value of $Kf_V$ or $Kf_H$, indicating that the higher the karst development degree of the strata. And the smaller the value of $Kf_V$ or $Kf_H$, indicating that the lower the karst development degree of the strata.

Step 13, determining the available reservoir development degree of the undetermined reservoir according to the karst belts and the result of the classified karst development degree.

According to the karst belts and the result of the classified karst development degree, the development condition of the available reservoir is determined. The correspondence between different karst belts and the available reservoir is that, good reservoirs are developed in the vertical percolation karsts, and normal reservoirs or poor reservoirs are developed in the horizontal underwater current karsts. On the basis of the favorable karst belts where the reservoirs are located, if the karst development degree reaches a better or best level, the corresponding reservoir is a good one, of which the reservoir productivity can reach industrial capacity. And if the karst development degree is of poor level, the reservoir is poor and cannot meet requirements of the industrial capacity.

According to the technical solution proposed in this embodiment, by means of classifying the karst development degree of the undetermined reservoir based on the vertical denudation pore features, the horizontal denudation pore features and the well logging feature parameters extracted from the electrical imaging logging image data, the karst belts of the reservoir can be identified quickly and visibly, and the karst development degree can be classified. The discrimination result is consistent with that of cores, which provides important technical supports for exploration and development of an oil-gas field.

The technical solutions proposed in the present invention are described in detail below through embodiments.

Embodiment 1

Figure 2:
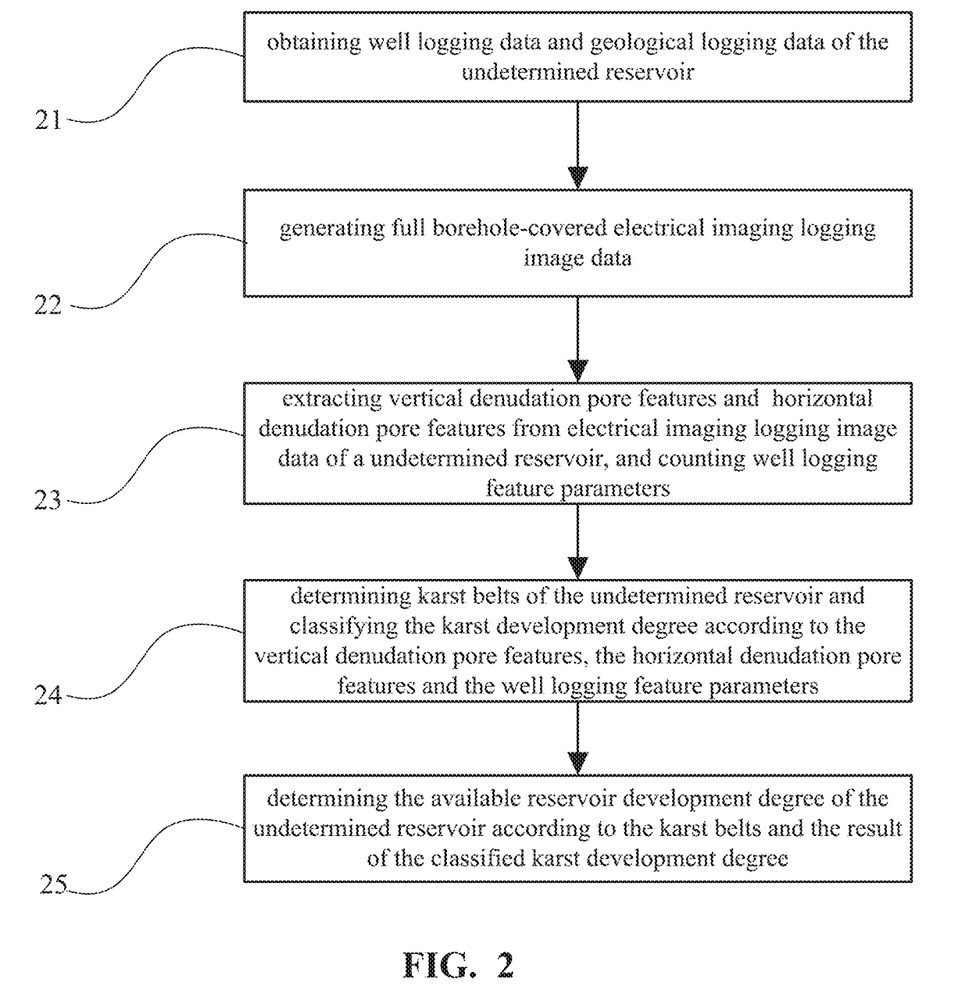
FIG. 2 is a flowchart of the method for determining the karst development degree of the reservoir proposed in Embodiment 1.

As illustrated in FIG. 2, the method for determining the karst development degree of the reservoir proposed in this embodiment includes:

Step 21, obtaining well logging data and geological logging data of the undetermined reservoir.

The well logging data of the undetermined reservoir mainly includes the electrical imaging logging data of the objective intervals in the research area and also other conventional well logging data, geological data, logging data and relevant data of description and analysis of cores, for purposes of comprehensive discrimination of development position of the karst and stratigraphic position.

Step 22: generating full borehole-covered electrical imaging logging image data.

Figure 3:
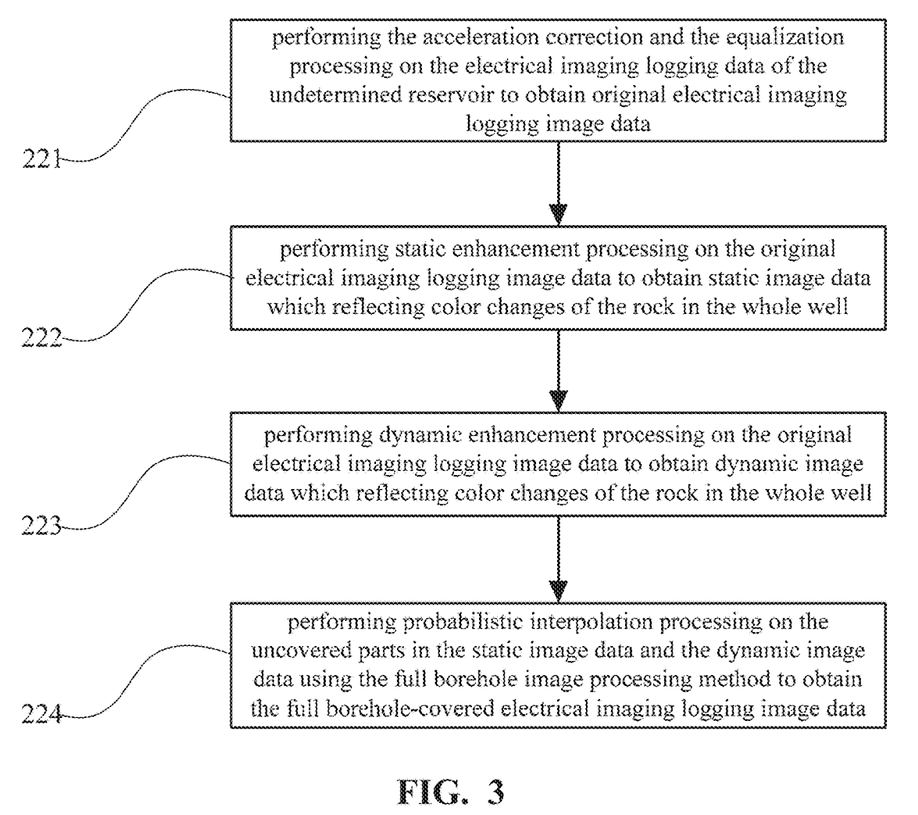
FIG. 3 is a flowchart of generating full borehole-covered electrical imaging logging image data proposed in the Embodiment 1.

The full borehole-covered electrical imaging logging image data can be obtained after pre-processing, static enhancement, dynamic enhancement, and full borehole image generation processing of the electrical imaging logging data. As illustrated in FIG. 3, the process may includes:

Step 221: performing the acceleration correction and the equalization processing on the electrical imaging logging data of the undetermined reservoir to obtain original electrical imaging logging image data.

Step 222: performing static enhancement processing on the original electrical imaging logging image data to obtain static image data which reflecting color changes of the rock in the whole well.

Step 223: performing dynamic enhancement processing on the original electrical imaging logging image data to obtain dynamic image data which reflecting color changes of the rock in the whole well.

Step 224, performing probabilistic interpolation processing on the uncovered parts in the static image data and the dynamic image data using the full borehole image processing method to obtain the full borehole-covered electrical imaging logging image data.

Figure 4:
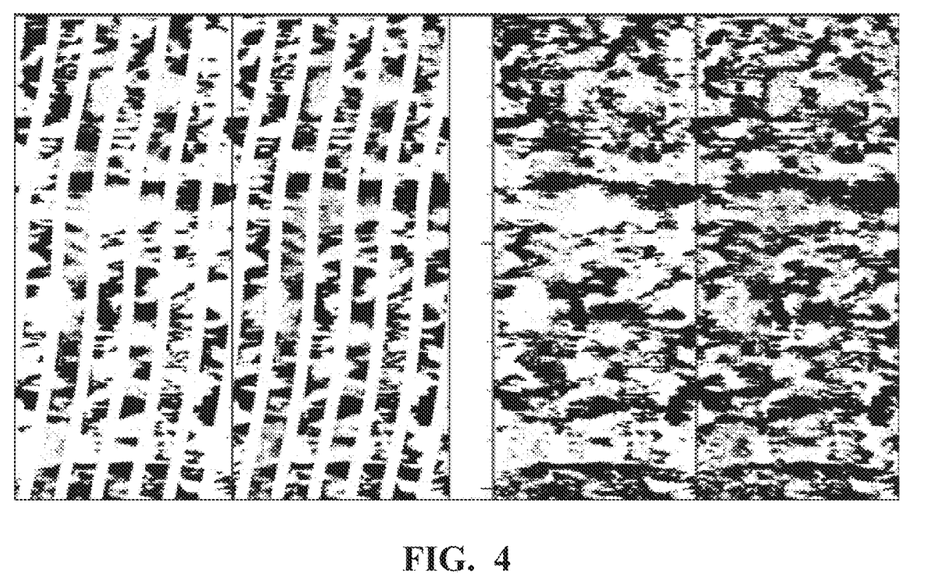
FIG. 4 is a schematic diagram of static and dynamic full borehole image information obtained by processing the electrical imaging logging data proposed in the Embodiment 1.

In this step, taking well A in an oil-gas field as an example. The static image data and the dynamic image data after the enhancement processing can be shown with reference to the images of two parts on the left in FIG. 4. The static image data and the dynamic image data after the full borehole image processing can be shown with reference to the images of two parts on the right in FIG. 4. It can thus be seen that, the blank part of the original image can be effectively removed through the full borehole image processing, so as to make image features more complete and intuitive, which lays a foundation for automatic identification and extraction of the image features in a later period.

Step 23, extracting vertical denudation pore features and horizontal denudation pore features from electrical imaging logging image data of a undetermined reservoir, and counting well logging feature parameters.

In practice, step 23 can also extract the vertical denudation pore features and the horizontal denudation pore features from the full borehole-covered static image data and dynamic image data through existing image processing techniques. A specific method for quantitatively extracting image features may includes three parts: the feature color, the feature morphology and the feature texture. Such step is based on the electrical imaging logging image segmentation, the category to which the features belong is determined after comprehensive analysis of the feature color, the feature morphology and the feature texture.

Alternatively, the feature color is mainly refers to the magnitude and distribution of the grayscale value within pixel points contained in the feature object, and described using the maximum value of grayscale Gmax, the minimum value of grayscale Gmin, and the mean value of grayscale Gavg.

Alternatively, the analysis of the feature morphology is mainly described in four parameters: the feature area A, the width-to-length ratio F, the roundness R, and the direction D, which can be determined in the following method.

Setting the single pixel point area of the imaging logging image as a unit area and the feature area A as an actual pixel point number that the feature object contains.

The width-to-length ratio F describes the slender degree of the feature object, F=W/L, where L is length of the object's minimum bounding rectangle and W is width of the object's minimum bounding rectangle.

The roundness R describes the rounding degree of the feature object, $R=P^2/A$, where P is the circumference of the object, calculated based on the object's boundary points, and A is the feature area.

The direction D describes the extended orientation of the feature object, that is, the angle of the feature object between a long axis direction and a horizontal direction.

Alternatively, for feature texture analysis, this step proposes the use of the gray-level co-occurrence matrix method to quantitatively calculate texture feature parameters, such as second-order moment of the texture $W_M$, contrast ratio $W_C$, uniformity $W_H$ and the like, which can be determined in the following method:

For an image S, if a function $f(x_1, y_1)$ defines the spatial relationship between two parameters, elements in S's grayscale co-occurrence matrix p are defined as:

$$p(g_1, g_2) = \frac{\{[(x_1, y_1), (x_2, y_2)] \in S \mid f(x_1, y_1) = g_1 \ \& \ f(x_2, y_2) = g_2\}}{\#S} \quad (1)$$

In formula (1), the numerator on the right side of the equal sign indicates the number of elements pair having the spatial relationship $f(x_1, y_1)$ and the values divided into $g_1$ and $g_2$, while the denominator indicates the total number of elements pair in S (# S).

The parameters of texture, such as the second-order moment of the texture $W_M$, the contrast ratio $W_C$, and the uniformity $W_H$ can be calculated in formulas as follows:

$$W_M = \sum g_1 \sum g_2 p^2(g_1, g_2) \quad WM = g1g2p2\,(g1, g2) \quad (2)$$

$$W_C = \sum g_1 \sum g_2 |g_1 - g_2| p(g_1, g_2) \quad WC = g1g2g1 - g2p\,(g1, g2) \quad (3)$$

$$W_H = \sum g_1 \sum g_2 \frac{p(g_1, g_2)}{k + |g_1 - g_2|} \quad WH = g1g2p\,(g1, g2)\,k + g1 - g2 \quad (4)$$

According to the vertical denudation pore features and the horizontal denudation pore features obtained by extraction, counting the plane porosity Ap, average particle size Gs and number N of the denudation pores in the unit depth range.

The number N describes the development degree of features, and determined by the accumulation of feature counts in unit depth.

the plane porosity Ap describes strength of the feature development and $Ap=\Sigma_{i=1}^{N} A_i/S_0$, where $A_i$ represents the area of the extracted feature object, and $S_0$ represents the total area of the counted image in unit depth.

The average particle size Gs describe the average size of the features which can be described by the Feret diameter. A single feature particle size $Gs_i$ can be averaged by measuring diameters of the feature object in multiple directions, and the average particle size in the unit depth range can be determined as: $Gs=\Sigma_{i=1}^{N} Gs_i/N$.

Figure 5:
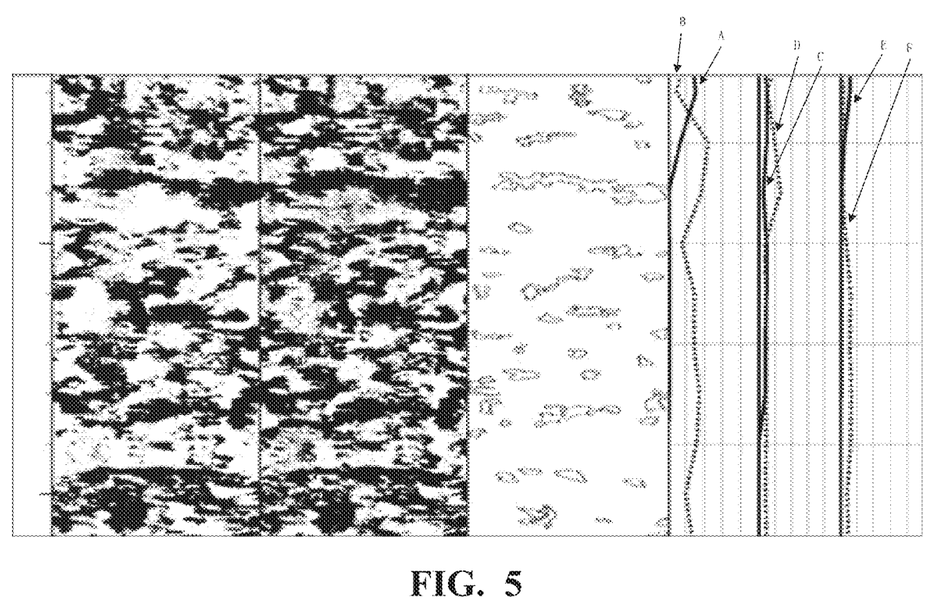
FIG. 5 is a schematic diagram of boundaries of vertical denudation pore, horizontal denudation pore and feature parameters extracted by the electrical imaging logging image proposed in the Embodiment 1.

FIG. 5 illustrates the feature extraction effects and the statistical results of the feature parameters in this step, in which the images from the first to third parts in the left represent information on depth, full borehole static image and dynamic image, respectively; the image in the fourth part is the extracted feature boundary of the vertical denudation pore and the horizontal denudation pore; the images in the fifth to seventh parts represent the the plane porosity, the average particle size and the number of the vertical denudation pore and the horizontal denudation pore obtained by counting, respectively. Wherein, the curve A represents the plane porosity of the vertical denudation pore, the curve B represents the plane porosity of the horizontal denudation pore, the curve C represents the vertical average particle size, the curve D represents the horizontal average particle size, the curve E represents the number of vertical parameters, and the curve F represents the number of horizontal parameters.

Step 24: determining karst belts of the undetermined reservoir and classifying the karst development degree according to the vertical denudation pore features, the horizontal denudation pore features and the well logging feature parameters.

The type to which the karst belts pertain can be discriminated according to the plane porosity of the vertical denudation pore features and the horizontal denudation pore features. If the plane porosity of the vertical denudation pore $Ap_V$ is greater than the plane porosity of the horizontal denudation pore $Ap_H$, the corresponding formation is located in the vertical percolation karsts, otherwise, located in the horizontal underwater current karsts.

Alternatively, the karst development degree can be classified according to the development index of karst of the vertical percolation karsts $Kf_V$ and the development index of the horizontal underwater current karsts $Kf_H$ which are determined by the plane porosity, the particle sizes, the number, the formation porosity and the karst thickness of the denudation pore in the present embodiment.

The development index of the vertical percolation karsts $Kf_V$ can be determined in the following formula:

$$Kf_V = a_V * Ap_V + b_V * Gs_V + c_V * N_V + d_V * \emptyset_V + e_V * H_V$$

where $Kf_V$ is the development index of the vertical percolation karsts; $Ap_V$ is the plane porosity of the vertical denudation pore; $Gs_V$ is the average particle size of the vertical denudation pore; $N_V$ is the number of the vertical denudation pore; $\emptyset_V$ is the calculated porosity of conventional well logging of the corresponding formation; $H_V$ is the total thickness of the determined vertical percolation karsts; and $a_V$, $b_V$, $c_V$, $d_V$, $e_V$ are predetermined area parameters, respectively, determined according to the development strength and scale of the overall karst in the vertical percolation karsts of the undetermined reservoir.

The development index of the horizontal underwater current karsts $Kf_H$ can be determined in the following formula:

$$Kf_H = a_H * Ap_H + b_H * Gs_H + c_H * N_H + d_H * \emptyset_H + e_H * H_H$$

where $Kf_H$ is the development index of the horizontal underwater current karsts; $Ap_H$ is the plane porosity of the horizontal denudation pore; $Gs_H$ is the average particle size of the horizontal denudation pore; $N_H$ is the number of the horizontal denudation pore; $\emptyset_H$ is the calculated porosity of conventional well logging of the corresponding formation; $H_H$ is the total thickness of the determined horizontal underwater current karsts; and $a_H$, $b_H$, $c_H$, $d_H$, $e_H$ are predetermined area parameters, respectively, determined according to the development strength and scale of the overall karst of the horizontal underwater current karsts of the undetermined reservoir.

According to the determined development index of the vertical percolation karsts $Kf_V$ and the development index of the horizontal underwater current karsts $Kf_H$, the karst development degree can be classified. The greater the value of $Kf_V$ or $Kf_H$, indicating that the higher the karst development degree of strata. And the smaller the value of $Kf_V$ or $Kf_H$, indicating that the lower the karst development degree of the strata. Alternatively, the development index of stratigraphic karst can be quantitatively divided into three levels according to the development index of the karst:

Grade I karst: vertical percolation karsts $Kf_V \geq CPv_I$; horizontal underwater current karsts $Kf_H \geq CPh_I$.

Grade II karst: vertical percolation karsts $CPv_{II} \leq Kf_V < CPv_I$; horizontal underwater current karsts $CPh_{II} \leq Kf_H < CPh_I$.

Grade III karst: vertical percolation karsts $Kf_V < CPv_{II}$; horizontal underwater current karsts $Kf_H < CPh_{II}$.

Wherein, $CPv_I$, $CPv_{II}$, $CPh_I$, $CPh_{II}$ are standards for classifying the karst development degree in Grade I and Grade II for vertical percolation karsts and horizontal underwater current karsts, respectively, and which can usually be valued at 6.5, 3.5, 6.0, 3.0 according to the actual karst development degree of the regions.

Figure 6:
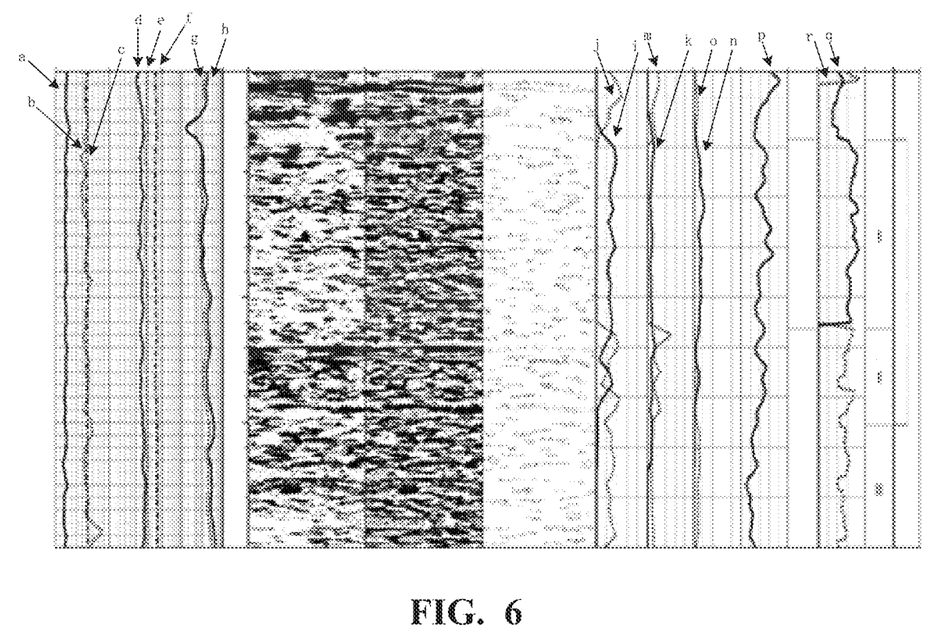
FIG. 6 is a schematic diagram of the classification results of the karst belts and the karst development degree proposed in the Embodiment 1.

For instance, FIG. 6 illustrates karst belts and the karst development degree classified by feature parameters of the karst. Wherein the curve a in the first part of the image from the left represents the conventional natural gamma ray (GR), the curve b represents the photoelectric absorption eoss-section index (PE), the curve c represents the caliper (CAL). The curve d in the second part of the image represents the density (DEN), the curve e represents neutron (CNL), the curve f represents the sound wave (AC). The curve g in the third part of the image represents deep lateral resistivity (RD), the curve h represents shallow lateral resistivity (RS). The fourth part is depth. The fifth to seventh parts of the image represent information on full borehole static image and dynamic images, and the extracted feature boundary of the vertical denudation pore and the horizontal denudation pore. In the eighth part of the image, the curve i represents the plane porosity of the vertical denudation pore features, the curve j represents the plane porosity of the horizontal denudation pore features. In the ninth part of the image, the curve k represents the particle size of the vertical denudation pore features, the curve m represents the particle size of the horizontal denudation pore features. In the tenth part of the image, the curve n represents the number parameter of the vertical denudation pore features, the curve o represents the number parameter of the horizontal denudation pore features. In the eleventh part of the image, the curve p represents the porosity. In the twelfth part of the image, it is the result of identifying karst belts, which consists of three parts: the uppermost part being the top of the karst, the intermediate part being vertical percolation karsts and the lowermost part being horizontal underwater current karsts. The thirteenth part of the image is the calculated development index of the karst, wherein the curve q represents the development index of the vertical percolation karsts and the curve r represents the development index of the horizontal underwater current karsts. The fourteenth part of the image represents the karst development degree classified according to the development index of the karst. The uppermost part is the karst in Grade I, the intermediate part is the karst in Grade II and the lowermost part is the karst in Grade III. The fifteenth part of the image represents the interpretation result of the available reservoir, wherein the karst in Grades I and II can meet the requirements of industrial capacity.

As can be seen from FIG. 6, the upper part of the well is mainly characterized by vertical denudation pores, which are divided into vertical percolation karsts; and the lower part is horizontal underwater current karsts. The karst development index calculated by combining the conventional porosity and the developmental thickness of the identified karst belts indicates that, the higher overall development degree of the vertical percolation karsts, the development index of the karst is essentially above 6.5, which can be classified into development of the karst in Grade I. In the horizontal underwater current karsts, the plane porosity of the pores and particle sizes decreases from the upper part to the lower part, and the degree of karstification gradually decreases. The development index of the upper karst is distributed between 6 and 8, which can be classified into the karst in Grade I. The development index of the lower karst is mainly distributed between 4 and 6, which can be classified into the karst in Grade II.

Step 25: determining available reservoir development degree of the undetermined reservoir according to the karst belts and the result of the classified karst development degree.

Determining the development condition of the available reservoir according to the karst belts and the result of the classified karst development degree. The well section (3954.0-3965.0 m) as shown in FIG. 6 is located at the upper part of the vertical percolation karsts and the horizontal underwater current karsts, which pertains to a favorable reservoir development position as a whole. And meanwhile, the greater karst development index calculated in this section indicates the high karst development degree, the karst development degree is in Grade I, which is comprehensively assessed as industrial gas section.

This embodiment was applied on-site in well A of a certain oil-gas field. We can quickly and visually identify karst belts in a reservoir and classify the karst development degree. The discrimination result is consistent with that of cores, which provides important technical supports for exploration and development of an oil-gas field.

The method for determining the karst development degree of the reservoir proposed in this embodiment has the following advantages.

1) A classification method of development degree of karstification of weathered crust karst-type reservoirs extracted based on electrical imaging logging images features was proposed and implemented. Karst features were extracted directly from the electrical imaging logging images and its feature parameters were quantitatively calculated for classification of karst development degree, which avoids multi-solution problems caused by description of the electrical imaging logging.

2) A quantitative calculation method of the karst development index was established by characterizing parameters of denudation pore, such as the plane porosity, the particle sizes, the number, the formation porosity and the karst thickness, and the corresponding relationship between this index and the karst development degree was established, which solved the uncertainty in the evaluation of the karst development degree of the the reservoir.

3) It was proposed that the karst development degree of the reservoir could be divided into three grades, which is of great significance to quality evaluation of the well logging reservoirs. It has significant effects in field application of scheduled oil-gas fields.

Embodiment 2

Figure 7:
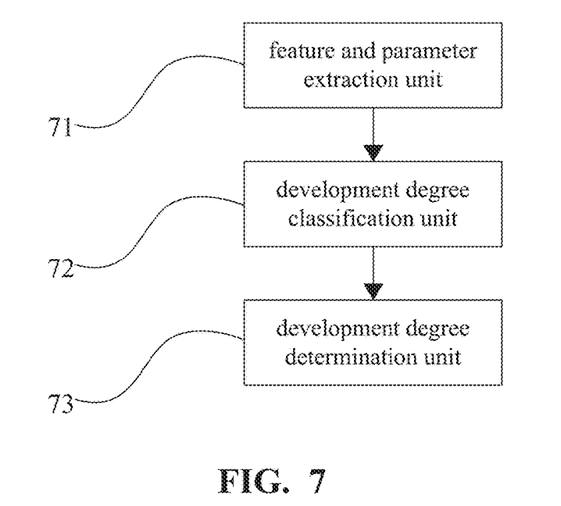
FIG. 7 is a structural diagram of a device for determining the karst development degree of the reservoir proposed in the Embodiment 2.

This embodiment provides a device for determining the karst development degree of a reservoir. As illustrated in FIG. 7, the device includes:

A feature and parameter extraction unit 71, configured to extract vertical denudation pore features and horizontal denudation pore features from electrical imaging logging image data of a undetermined reservoir, and count well logging feature parameters;

A development degree classification unit 72, configured to determine karst belts of the undetermined reservoir and classify the karst development degree according to the vertical denudation pore features, the horizontal denudation pore features and the well logging feature parameters.

A development degree determination unit 73, configured to determine the available reservoir development degree of the undetermined reservoir according to the karst belts and the result of the classified karst development degree.

The feature and parameter extraction unit 71 can obtain the electrical imaging logging image data of the undetermined reservoir through the existing electrical imaging logging method and obtain the static images and dynamic images after processing the electrical imaging logging image data by the predetermined image processing method, and then, obtain the vertical denudation pore features and the horizontal denudation pore features of electrical imaging logging image data by quantitatively extracting the static images and dynamic images.

The development degree classification unit 72 can determine the karst belts of the undetermined reservoir according to the vertical denudation pore features and the horizontal denudation pore features. If the plane porosity of the vertical denudation pore $Ap_V$ is greater than the plane porosity of the horizontal denudation pore $Ap_H$, the corresponding undetermined reservoir can be determined to be located in vertical percolation karsts, otherwise it is located in horizontal underwater current karsts. According to the determined development index of the vertical vertical percolation karsts $Kf_V$ and the development index of the horizontal underwater current karsts $Kf_H$, the karst development degree can be directly classified. The greater the value of $Kf_V$ or $Kf_H$, indicating the higher the karst development degree of the strata. And the smaller the value of $Kf_V$ or $Kf_H$ indicating the lower the karst development degree of the strata.

The development degree determination unit 73 can determine the development condition of the available reservoir according to the karst belts and the result of the classified karst development degree. The correspondence between different karst belts and the available reservoir is that, good reservoirs are developed in the vertical percolation karsts, and normal reservoirs or poor reservoirs are developed in the horizontal underwater current karsts. On the basis of the favorable karst belts where the reservoirs are located, if the karst development degree reaches a better or best level, the corresponding reservoir is a good one, of which the reservoir productivity can reach industrial capacity. And if the karst development degree is of poor level, the reservoir is poor and cannot meet requirements of the industrial capacity.

According to the technical solution proposed in this embodiment, by means of classifying the karst development degree of the undetermined reservoir based on the vertical denudation pore features, the horizontal denudation pore features and the well logging feature parameters extracted from electrical imaging logging image data, the karst belts of the reservoirs can be identified quickly and visibly, and the karst development degree can be classified. The discrimination result is consistent with that of cores, which provides important technical supports for exploration and development of an oil-gas field.

Embodiment 3

This embodiment of the present invention provides an electronic device including the device for determining the karst development degree of the reservoir as claimed in the Embodiment 2.

Figure 8:
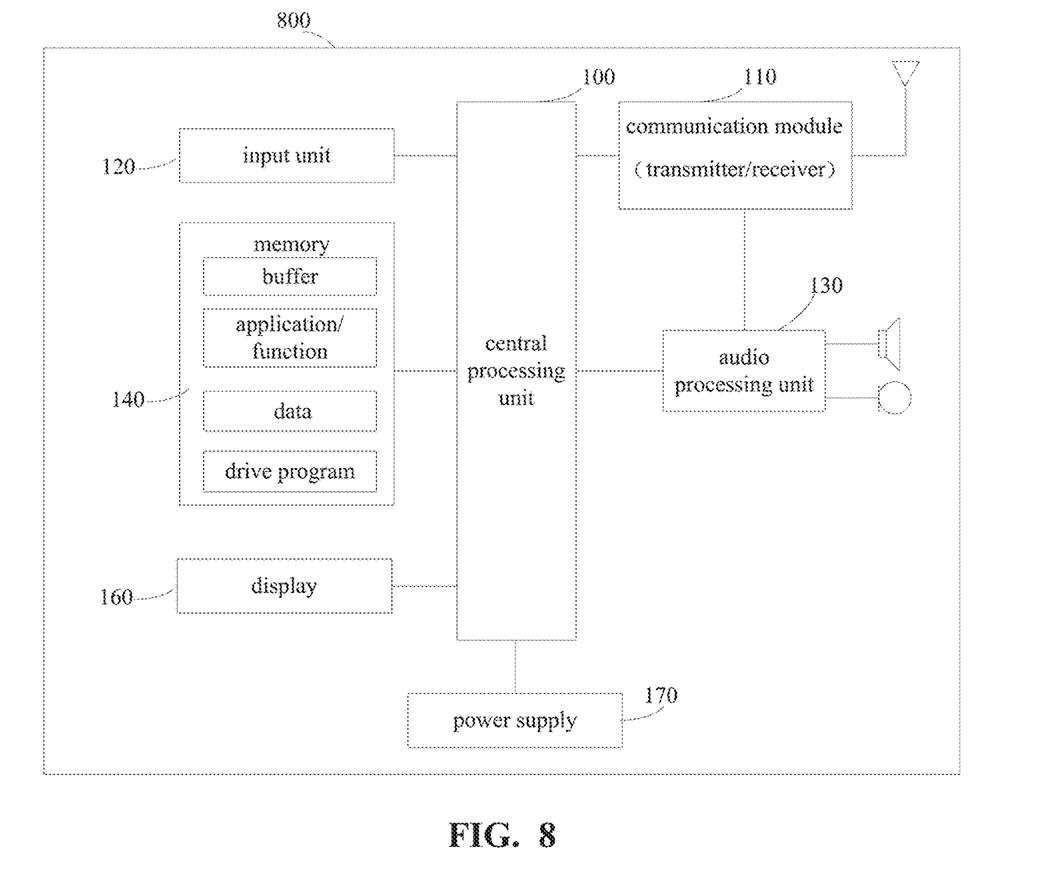
FIG. 8 is a structural diagram of the electronic device proposed in the Embodiment 3.

FIG. 8 is a schematic block diagram of the system comprised of the electronic device in the Embodiment of the present invention. As illustrated in FIG. 8, the electronic device 800 may includes a central processing unit 100 and a memory 140. The memory 140 is coupled to the central processing unit 100. It should be noted that, FIG. 8 is exemplary. Other types of structures may also be used to supplement or replace the structure to effect telecommunication or other functions.

In one embodiment, functions of a device that determines the karst development degree of reservoirs may be integrated into the central processing unit 100. The CPU 100 can be configured to perform the following operation: extract vertical denudation pore features and horizontal denudation pore features from electrical imaging logging image data of a undetermined reservoir, and count well logging feature parameters; determine karst belts of the undetermined reservoir and classify the karst development degree according to the vertical denudation pore features, the horizontal denudation pore features and the well logging feature parameters; and determine the available reservoir development degree of the undetermined reservoir according to the karst belts and the result of the classified karst development degree.

In another embodiment, the device for determining the karst development degree of reservoirs may be configured separately from the CPU 100. For example, the device for determining the karst development degree of reservoirs may be configured as a chip connected to the CPU 100 and achieve functions of the device that determines the karst development degree of reservoirs by control of the central processing unit.

As illustrated in FIG. 8, the electronic device 800 may further includes: a communication module 110, an input unit 120, an audio processing unit 130, a display 160, and a power supply 170. It should be noted that the electronic device 800 does not necessarily include all the components illustrated in FIG. 8. In addition, the electronic device 800 may further includes components that not illustrated in FIG. 8, and reference may be made to the prior art.

As illustrated in FIG. 8, the central processor 100 is also referred to as a controller or operational control. It may include a microprocessor or other processor device and/or logic device. And the central processor 100 receives inputs and controls the operations of each component of the electronic device 800.

The memory 140, for example, may be one or more of a buffer, a flash memory, a hard drive, a removable medium, a volatile memory, a non-volatile memory or other suitable device. The aforementioned failure-related information can be stored, in addition, the program for executing the relevant information may also be stored. And the CPU 100 may execute the program stored in the memory 140 to implement information storage or processing and the like. Functions of other components are similar to those in the prior art and details are not described herein again. The components of the electronic device 800 may be implemented by dedicated hardware, firmware, software or a combination thereof without departing from the scope of the present invention.

Embodiments of the present invention further provide a computer readable program, wherein when the program is executed in an electronic device, the program allows the computer to perform the method for determining the karst development degree of reservoirs in the electronic device according to the Embodiment 1.

Embodiments of the present invention further provide a storage medium storing a computer-readable program, wherein the computer-readable program allows the computer to perform the method for determining the karst development degree of reservoirs in the electronic device according to the Embodiment 1.

The technical solutions of the present invention are clearly and completely described in the Embodiments, where the Embodiments are merely some but not all of the Embodiments of the present invention. All other Embodiments obtained by those skilled in the art based on the Embodiments of the present invention without creative efforts shall fall within the protection scope of the present invention

The invention claimed is:

1. A method for determining a karst development degree of a reservoir, the method comprising:
   extracting vertical denudation pore features and horizontal denudation pore features from electrical imaging logging image data of an undetermined reservoir, and counting well logging feature parameters;
   determining karst belts of the undetermined reservoir and classifying the karst development degree according to the vertical denudation pore features, the horizontal denudation pore features, and the well logging feature parameters; and
   determining an available reservoir development degree of the undetermined reservoir according to the karst belts and a result of the classified karst development degree.

2. The method according to claim 1, wherein extracting vertical denudation pore features and horizontal denudation pore features from electrical imaging logging image data of the undetermined reservoir, and counting well logging feature parameters further comprises:
   obtaining full borehole-covered electrical imaging logging image data according to the electrical imaging logging image data of the undetermined reservoir; and
   extracting the vertical denudation pore features and the horizontal denudation pore features from the full borehole-covered electrical imaging logging image data, and counting the well logging feature parameters.

3. The method according to claim 2, wherein obtaining the full borehole-covered electrical imaging logging image data according to the electrical imaging logging image data of the undetermined reservoir comprises:
   performing acceleration correction and equalization processing on the electrical imaging logging image data of the undetermined reservoir to obtain original electrical imaging logging image data;
   performing static enhancement processing on the original electrical imaging logging image data to obtain static image data which reflect color changes of a rock in a whole well;
   performing dynamic enhancement processing on the original electrical imaging logging image data to obtain dynamic image data which reflect color changes of the rock in the whole well; and
   performing probabilistic interpolation processing on uncovered parts in the static image data and the dynamic image data using the full borehole image processing method to obtain the full borehole-covered electrical imaging logging image data.

4. The method according to claim 1, wherein extracting the vertical denudation pore features and the horizontal denudation pore features comprises:
   extracting a feature color, feature morphology, and feature texture.

5. The method according to claim 4, wherein the feature morphology of the electrical imaging logging image information comprises: feature area, width-to-length ratio, roundness, and direction; the feature area is an actual number of pixels contained in a feature object; the width-to-length ratio is a ratio of the width of a minimum bounding rectangle to the length of the minimum bounding rectangle of the feature object; the roundness is a ratio of twice a circumference of the feature object to the feature area; and the direction is an angle of the feature object between a long axis direction and a horizontal direction.

6. The method according to claim 4, wherein the feature texture of the electrical imaging logging image information comprises: second-order texture, contrast and uniformity of the feature object obtained by a grey-level co-occurrence matrix method.

7. The method according to claim 1, wherein the well logging feature parameters comprise: plane porosity, particle sizes, number of denudation pores, formation porosity, and karst thickness.

8. The method according to claim 7, wherein determining karst belts of the undetermined reservoir and classifying the karst development degree according to the vertical denudation pore features, the horizontal denudation pore features, and the well logging feature parameters comprise:
   determining a development index of vertical percolation karsts and a development index of horizontal underwater current karsts according to the well logging feature parameters; and
   classifying the karst development degree of the undetermined reservoir according to the development index of the vertical percolation karsts and the development index of the horizontal underwater current karsts.

9. The method according to claim 8, wherein the development index of the vertical percolation karsts is determined according to the formula below:

$$Kf_V = a_V * Ap_V + b_V * Gs_V + c_V * N_V + d_V * \emptyset_V + e_V * H_V$$

wherein $Kf_V$ is indicative of the development index of the vertical percolation karsts; $Ap_V$ is a plane porosity of a vertical denudation pore; $Gs_V$ is an average particle size of the vertical denudation pore; $N_V$ is a number of vertical denudation pores; $\emptyset_V$ is a calculated porosity of conventional well logging of the corresponding formation; $H_V$ is a total thickness of the determined vertical percolation karsts; and $a_V$, $b_V$, $c_V$, $d_V$, $e_V$ are predetermined area parameters, respectively.

10. The method according to claim 8, wherein the development index of the horizontal underwater current karsts is determined according to the formula below:

$$Kf_H = a_H * Ap_H + b_H * Gs_H + c_H * N_H + d_H * \emptyset_H + e_H * H_H$$

wherein $Kf_H$ is the development index of the horizontal underwater current karsts; $Ap_H$ is a plane porosity of a horizontal denudation pore; $Gs_H$ is an average particle size of the horizontal denudation pore; $N_H$ is a number of horizontal denudation pores; $\emptyset_H$ is a calculated porosity of conventional well logging of the corresponding formation; $H_H$ is a total thickness of the determined horizontal underwater current karsts; and $a_H$, $b_H$, $c_H$, $d_H$, $e_H$ are predetermined area parameters, respectively.

11. A non-transitory computer readable storage medium including computer readable instructions, wherein the computer readable instructions are executed to enable a processor to at least perform the method for determining the karst development degree of the reservoir in claim 1.

12. A device, comprising:
   a memory storing program instructions; and
   a processor coupled to the memory, executing the program instructions in the memory, and determining the available reservoir development degree of the undetermined reservoir according to claim 1.

* * * * *